US011960380B2

(12) United States Patent
Sariel et al.

(10) Patent No.: US 11,960,380 B2
(45) Date of Patent: Apr. 16, 2024

(54) DEBUGGING SQL STATEMENTS (71) Applicant: Red Hat, Inc., Raleigh, NC (US)

(72) Inventors: David Sariel, Holon (IL); Arie Bregman, Gan Yavne (IL)

(73) Assignee: RED HAT, INC., Raleigh, NC (US)

( * ) Notice: Subject to any disclaimer, the term of this patent is extended or adjusted under 35 U.S.C. 154(b) by 12 days.

(21) Appl. No.: 17/209,888

(22) Filed: Mar. 23, 2021

(65) Prior Publication Data

US 2022/0308985 A1 Sep. 29, 2022

(51) Int. Cl.
G06F 11/36 (2006.01)
G06F 16/28 (2019.01)

(52) U.S. Cl.
CPC ........ G06F 11/3644 (2013.01); G06F 16/284 (2019.01)

(58) Field of Classification Search
CPC .......................... G06F 11/3644; G06F 16/284
USPC ......................................................... 717/130
See application file for complete search history.

(56) References Cited

U.S. PATENT DOCUMENTS

| 6,609,123 | B1 | 8/2003 | Cazemier et al. |
| 7,155,426 | B2 | 12/2006 | Al-Azzawe |
| 7,181,446 | B2 | 2/2007 | Bossman et al. |
| 9,779,133 | B2 | 10/2017 | Bhagavan |
| 10,579,500 | B2 | 3/2020 | Li et al. |
| 2016/0062870 | A1* | 3/2016 | Menahem et al. .... G06F 11/462 717/125 |
| 2020/0226117 | A1* | 7/2020 | Mutalik Desai ...... G06F 16/284 |
| 2021/0334284 | A1* | 10/2021 | Bansal et al. ......... G06F 16/284 |

OTHER PUBLICATIONS

Xiang Zhou et al."Fault Analysis and Debugging of Microservice Systems_ . . . and Empirical Study" IEEE Transactions on Software Engineering, vol. 47, No. 2, Feb. 2021,pp. 243-260 (Year: 2021).*
Gathani et al., "Debugging Database Queries: A Survey of Tools, Techniques, and Users", Proceedings of the CHI Conference on Human Factors in Computing Systems (2020), pp. 1-16.
Sheldon, Robert, "SQL Server Metadata Functions: The Basics", Redgate Hub (Mar. 2016). Retrieved on or before Dec. 4, 2020. <https://www.red-gate.com/simple-talk/sql/t-sql-programming/sql-server-metadata-functions-the-basics/>.
Song et al., "Hierarchical Schema Representation for Text-to-SQL Parsing with Decomposing Decoding", in IEEE Access (2019), vol. 7, pp. 103706-103715.

* cited by examiner

*Primary Examiner* — Wei Y Zhen
*Assistant Examiner* — Mohammed N Huda (57) ABSTRACT

A method and system for debugging SQL statements by computing and saving to memory metadata for each component part of the statement. The system includes a user interface, memory, and a processor, the processor configured to compute and save to memory metadata of SQL statements. The stored metadata may be used for later computation of modified SQL statements. The metadata may also be displayed through a user interface to assist a user in the process of debugging component portions of an SQL statement.

20 Claims, 6 Drawing Sheets

DEBUGGING SQL STATEMENTS

BACKGROUND

SQL statements query databases to either store, retrieve, or manipulate data in that database. SQL statements are typically made of numerous elements or components, each specifying how the database should be queried by the statement. Each of these component parts direct the outcome of the SQL statement towards a portion of the database to be stored, retrieved, or manipulated as the components instruct.

SUMMARY

The present disclosure provides new and innovative systems and methods of debugging SQL statements. In an example, the method involves first receiving an SQL command that can be broken into composition components into an SQL editing program. Next, the method computes metadata for each component, the metadata representing a data structure and a traversal instruction. The method then involves saving the metadata of each composition component to a cache memory storage device.

The example further includes receiving a modification to the SQL statement or any composition component of the SQL statement. After receiving the modification, metadata associated with the modified composition components is computed and saved to the cache memory storage device.

Finally, the example further involves indicating the SQL statement in a view of the SQL editing program by showing each of the composition components with a unique attribute, such as a distinct color, background, or font. Lastly, the method involves displaying the metadata associated with a composition component in a second view when a user interacts with, such as hovering over or clicking, the component in the first view.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Debugging SQL statements is a challenging task today. There are many reasons why debugging SQL statements is challenging, but one of the primary reasons is because it takes a significant amount of time to query databases using SQL, an issue that is compounded by multi-component statements. As SQL statements increase in complexity, more computation must be done on the data of the database, which results in a longer iteration time while debugging these statements. Time between iterations is important for debugging SQL statements because if there is an error in the statement, the time taken to realize the error is inflated and the overall time take to reach the desired solution is greater.

In addition to increasing time take to reach a desired solution, errors in the SQL statement can also lead to unintended results. For example, two SQL statements that include all of the same criteria: "SELECT*FROM Customers ORDER BY City, Name LIMIT 5;" and "SELECT*FROM Customers ORDER BY Name, City LIMIT 5;" may lead to different results from these similar statements. Locating what could be simple errors in complex, multi-component SQL statements is a challenging task which compounds to make debugging these statements challenging.

The present disclosure solves issues currently present in the process of debugging SQL statements. For example, the method and system of the present disclosure may selectively compute the component parts of an SQL statement which improves the efficiency of debugging portions of the broader SQL statement and could save significant time in the debugging process. One example of this would involve three components: a first composition component that generates the results of an entire database, a second composition component that sorts the results in alphabetical order, and a third composition component that limits the results shown to five. Such a statement may be stated in the SQL programming language with the statement "SELECT*FROM Database ORDER BY Name LIMIT 5;". In the example, if the third component in the statement is modified, for example limiting the results to ten (i.e. LIMIT 10), while the first and second component parts remain unchanged, the method and system for debugging SQL statements of the present disclosure may compute the third component independent of the computation of the first or second components (i.e. only re-compute LIMIT 10). In traditional SQL debugging programs, changing a third component would query the database from the beginning, re-computing a solution to the modified SQL statement as a whole, taking significant time. The present disclosure would recognize that the first two components were unchanged and therefore selectively re-compute only the third component. In this way, debugging modified SQL commands using the method and system of the present disclosure takes a fraction of the time of traditional SQL debugging programs.

In another example, the present disclosure improves upon existing SQL debugging programs by allowing for rapid retrieval of the metadata or results of previously run commands. For example, in the process of debugging a composition component of an SQL command, a user may modify a component and then want to revert back to the original component. In the example, the method may involve storing the metadata or results of a previously computed composition component to a cache memory storage device each time the command is run. In a further example, the present disclosure may compute a modified SQL command, utilizing the metadata or results stored in the cache memory storage for the composition components that were previously computed. Instead of querying the database and computing metadata and results for previously computed components, this example of the present disclosure utilizes metadata for previously computed components from the cache memory storage, and only queries the database for components not previously computed.

In another example, the present disclosure solves the limitations of current SQL debugging programs by uniquely display component parts of the full SQL command in a view of the graphical user interface ("GUI") of a SQL debugging program. For example, the component parts of the SQL command may be visualized in different colors, fonts, or backgrounds in the GUI of the debugging program. While visualization tools for displaying components of SQL statements exist, they may not allow for rapid visualization of metadata associated with the components. For example, the present disclosure may provide a view for the inspection of the metadata, including the results, of each component part individually. By providing visualization tools for the components of an SQL statement, the debugging process is improved by allowing users to inspect each component part of the full SQL command and ensure each component is operating as expected or to consider whether there are improvements to the component parts of the SQL command to improve the run time efficiency of SQL query.

In another example, the present disclosure allows for the visualization of both the composition components of the SQL command in a first view and the metadata associated with the composition components in a second view. The second view may also display metadata in response to activity in the first view, such as a user hovering or clicking a component in the first view. In this example, interacting with a component in the first view would show the metadata associated with the component in the second view.

Figure 1:
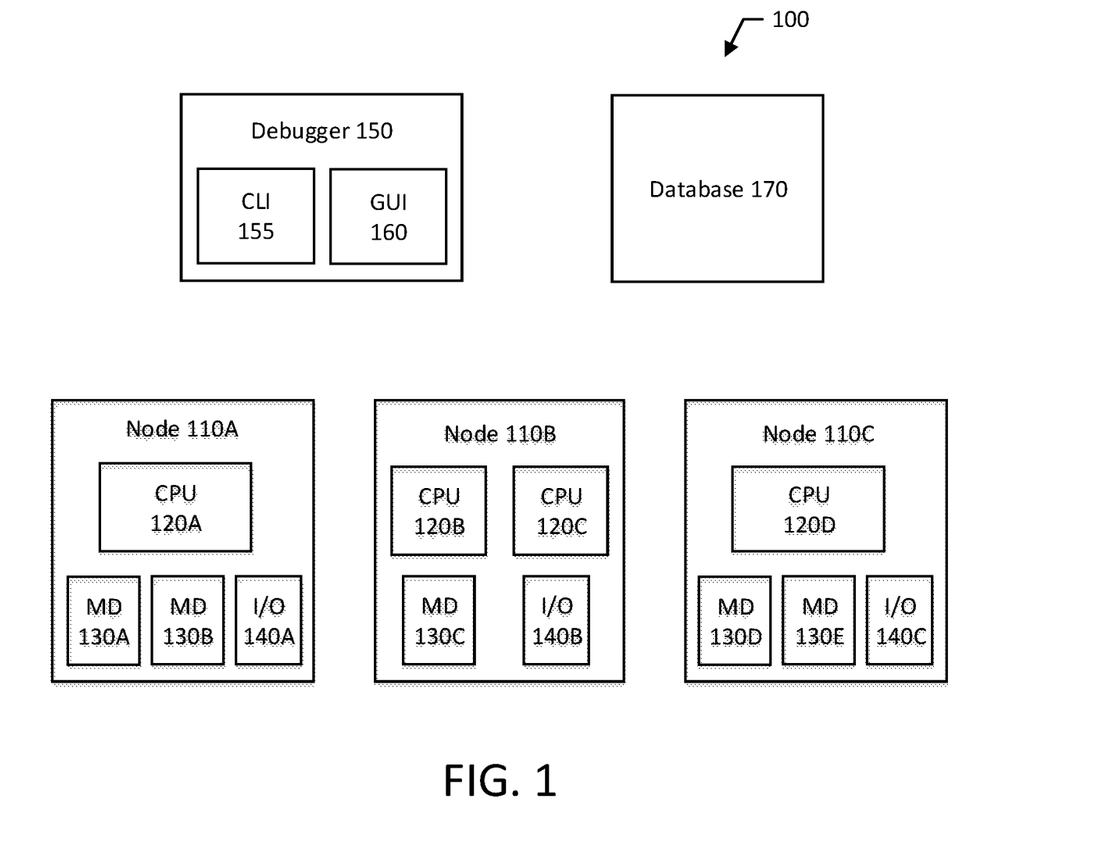
FIG. 1 illustrates a block diagram of an example debugging system according to an example embodiment of the present disclosure.

FIG. 1 depicts a high-level component diagram of an example computing system 100 in accordance with one or more aspects of the present disclosure. The computing system 100 may include a database 170, a debugger 150, and one or more nodes (e.g., nodes 110A-C).

The debugger 150 may include debugging tools, such as a command line interface ("CLI") 155 or GUI 160. In an example, the CLI 155 may be used by a used to input, edit, and debug SQL commands. In another example, the GUI 160 may be used by a user to input, edit, and debug SQL commands, and may also be used for visualizing the SQL command as well as additional information such as the metadata or the command results. In an example the CLI 155 or the GUI 160 are displayed on a display that is connected to at least one node 110A-C. Alternatively, the display may be connected to the database 170.

The nodes 110A-C may be cluster nodes with one or more machines running in a cluster. Each node 110A-C may in turn include one or more physical processors (e.g., CPU 120A-D) communicatively coupled to memory devices (e.g., MD 130A-E) and input/output devices (e.g., I/O 140A-C). Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc.

As used herein, a processor may also be referred to as a central processing unit (CPU). Additionally, as used herein, physical processor or processor (e.g., CPU 120A-D) refers to a device capable of executing instructions encoding arithmetic, logical, and/or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

As discussed herein, a memory device 130A-E refers to a volatile or non-volatile memory device, such as RAM, ROM, EEPROM, or any other device capable of storing data. As discussed herein, I/O device 140A-C refers to a device capable of providing an interface between one or more processor pins and an external device capable of inputting and/or outputting binary data.

Processors 120A-D may be interconnected using a variety of techniques, ranging from a point-to-point processor interconnect, to a system area network, such as an Ethernet-based network. Local connections within each node, including the connections between a processor 120A-D and a memory device 130A-E may be provided by one or more local buses of suitable architecture, for example, peripheral component interconnect (PCI).

Figure 2A:
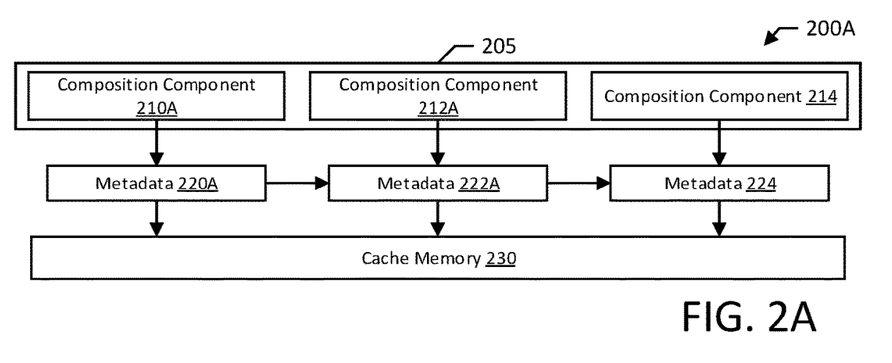
FIGS. 2A, 2B, and 2C illustrate a block diagram of an example debugging process according to an example embodiment of the present disclosure.
Figure 2B:
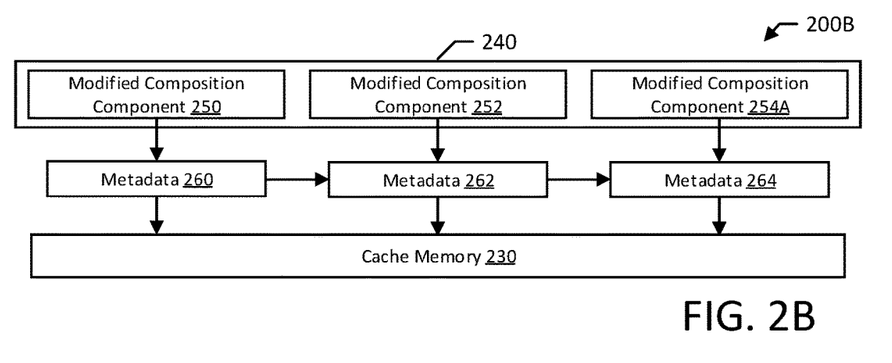
Figure 2C:
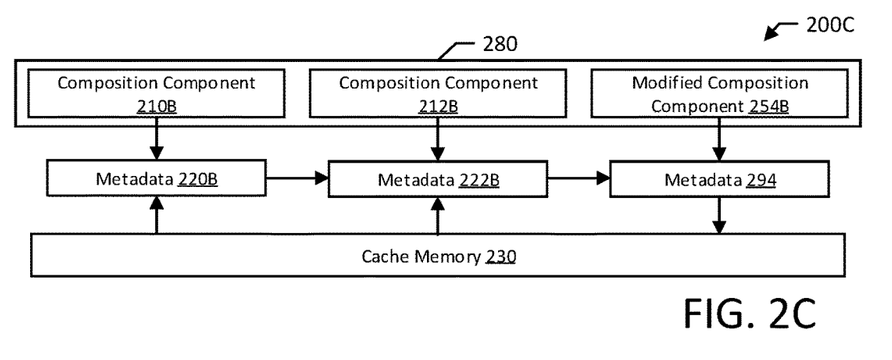

FIGS. 2A-C depict an example flow of debugging an SQL command 200A-C. FIG. 2A represents the computation of an SQL command 200A through the method and system of the present disclosure. FIG. 2B similarly represents the computation of a modified SQL command 200B. FIG. 2C represents the computation of a hybrid SQL command 200C, where some composition components are from the first SQL command 205 and some components are from the second SQL command 240.

In FIG. 2A, the SQL command 205 may be composed of multiple composition components. For example, the SQL command 205 illustrated in FIG. 2A is made up of three composition components 210A, 212A, and 214. In the example, each composition component 210A, 212A, 214 respectively has associated metadata 220A, 222A, 224 that represents how the composition component interacts with a database queried by the SQL command 205.

For example, each metadata 220A, 222A, 224 may represent the results of that composition component 210A, 212A, 214 applied to the database queried by the SQL command 205. In an example, the metadata 220A associated with a composition component 210A in the form of a "SELECT" statement may represent all lines in the database selected. For example, in an SQL statement 205 made up of a composition component 210A made up of the statement "SELECT*FROM Customers" where "Customers" is a table in a database, the metadata 220A associated with that composition component 210A may represent all entries and all data in the "Customers" table. In another example, in a composition component 210A made up of the statement "SELECT CustomerName, City FROM Customers" where "CustomerName" and "City" are columns in a table entitled "Customers" in a database, the metadata 220A associated with that composition component 210A may represent only the "CustomerName" and "City" data for all entries in the "Customers" table.

Alternatively or additionally, the metadata 220A, 222A, 224 may represent data about the results of that composition component 210A, 212A, 214 applied to the database queried by the SQL command 205, such as the number of lines or columns present in the results, the size of the results, the data structure of the results, or the any other information about the component statement 210A, 212A, 214 or the SQL command 205. For example, in an SQL statement 205 made up of a composition component 210A made up of the statement "SELECT*FROM Customers" where "Customers" is a table in a database, the metadata 220A associated with the composition component 210A may represent the total number of lines or columns in the "Customers" table.

Alternatively and additionally, the metadata 220A, 222A, 224 may represent data about the composition component 210A, 212A, 214 applied to the database queried by the SQL command 205. For example, in an SQL statement 205 made up of a composition component 210A made up of the statement "SELECT*FROM Customers" where "Customers" is a table in a database, the metadata 220A associated with that composition component 210A may represent the time taken to retrieve results of the component 210A. In another example, the metadata 220A may include suggestions for improving or streamlining the computation of the component 210A. In another example, the metadata 222A may include instructions for filtering metadata of a previously computed composition component 220A.

Alternatively and additionally, metadata 220A for a first composition component 210A may relate to a tree in a database, the tree allowing for rapidly querying the database. The tree may also be represented with the nodes of the tree taking a <key, value> format, where the key is a composition of the table's primary keys (e.g. <key1, key2, key3>). This allows for rapid computation of further composition components 212B, 214. In this example, the remaining composition components 212A, 214 are keys for interpreting the table of the metadata 220A of the first composition component 210A. In this way, metadata 222A, 224 may be rapidly computed by interpreting the tree represented by the metadata 220A using the keys of the composition components 212A, 214.

In SQL commands that are made up of more than one composition component, the metadata associated with each component is a function of the query of the composition component and the metadata of the preceding component. For example, in an SQL statement 205 made up of a composition component 210A made up of the statement "SELECT*FROM Customers" where "Customers" is a table in a database, and a second composition component 212A made up of the statement "ORDER BY CustomerName" where "CustomerName" is a column in the "Customers" table, the metadata 222A associated with that composition component 212A depends on the metadata 220A of the preceding composition component 210A as well as the current component 212A. More specifically, if the first component 210A instead said "SELECT CustomerName, City FROM Customers," the metadata 220A associated with that component 210A may be different (e.g. a different shape). With different metadata 220A, the metadata 222A associated with the second composition component 212A, may also be different (e.g. a different shape).

Similarly, in SQL commands made up of at least three composition components, the metadata of the third and any subsequent composition component also relies on the component preceding the component being analyzed. For example, in an SQL statement 205 made up of a second composition component 212A made up of the statement "ORDER BY CustomerName" where "CustomerName" is a column in a database, and a third composition component 214 made up of the statement "LIMIT 10", the metadata 224 associated with that third composition component 214 depends on the metadata 222A of the preceding composition component 212A as well as the current component 214. More specifically, if the second component 212A instead said "ORDER BY City," the metadata 222A associated with that component 212A may be different (e.g. a different order of entries). With different metadata 222A, the metadata 224 associated with the third composition component 214, may also be different (e.g. result in different entries).

In an example, the metadata 220A, 222A, 224 associated with the composition components 210A, 212A, 214 may be stored in a cache memory storage device 230. The cache memory storage device 230 refers to a volatile or non-volatile memory device, such as RAM, or any other device capable of caching data.

Similarly, in FIG. 2B, the SQL command 240 may be composed of multiple composition components. For example, in the SQL command 240 illustrated in FIG. 2B is made up of three modified composition components 250, 252, and 254A. In an example, at least one of the modified composition components 250, 252, 254A is distinct from the composition components 210A, 212A, 214 in SQL command 205. In the example, each modified composition component 250, 252, 254A respectively has associated metadata 260, 262, 264 that represents how the modified composition component interacts with a database queried by the SQL command 240.

For example, as described with metadata 220A, 222A, 224 above, each metadata 260, 262, 264 may represent information about the respective modified composition component 250, 252, 254A. The metadata 260, 262, 264 may represent the results of the respective modified composition component 250, 252, 254A. Alternatively and additionally, the metadata 260, 262, 264 may represent data about the results of that modified composition component 250, 252, 254A, such as the number of lines or columns in the results of the composition component 250, 252, 254A. Alternatively, the metadata 260, 262, 264 may represent data about the modified composition component 250, 252, 254A, such as the time taken to compute results or suggestions for improvement of the component 250, 252, 254A.

For example, in an SQL statement 240 "SELECT*FROM Suppliers WHERE SupplierName LIKE 'B %' LIMIT 25;" where "Suppliers" is a table in a database and "SupplierName" is a column in the "Suppliers" table. In this example SQL statement 240, the metadata 260 associated with that modified composition component 250, "SELECT*FROM Suppliers", may represent all entries and all data in the "Suppliers" table, information about those results such as the total number of rows or columns in the "Suppliers" table, and/or information about the command clause itself, such as the computation time. Similarly, the metadata 262 associated with modified composition component 252, "WHERE SupplierName LIKE 'B %'", may represent the results, data about the results, or data about the component itself. Similarly, metadata 264 associated with modified composition component 254A, "LIMIT 25;", may also represent the results, data about the results, or data about the component itself related to that component 254A.

In SQL commands that are made up of more than one composition component, the metadata associated with each component is a function of the query of the composition component and the metadata of the preceding component. Similarly to SQL statement 205 described above, metadata 262 is a function of both metadata 260 and composition component 252. If metadata 260 were different, composition component 252 is acting upon different information and could lead metadata 262 to be different (e.g. a different shape or different resulting entries). Similarly, if composition component 252 was different, the instruction provided by the component 252 could lead to different results or otherwise different metadata 264. Similarly, if metadata 262 or composition component 254A were different, metadata 264 could also be different.

As with metadata 220A, 220B, 224, the metadata 260, 262, 264 associated with the composition components 250, 252, 254A may be stored in a cache memory storage device 230. As discussed above, the cache memory storage device 230 refers to a volatile or non-volatile memory device, such as RAM, or any other device capable of caching data.

In FIG. 2C, the SQL command 280 may be composed of multiple composition components. For example, the SQL command 280 illustrated in FIG. 2C is made up of three composition components 210B, 212B, and 254B. In the example, each composition component 210B, 212B, 254B respectively has associated metadata 220B, 222B, 294 that represents how the composition component interacts with a database queried by the SQL command 280.

For example, as described with metadata 220A, 222A, 224 above, each metadata 220B, 222B, 294 may represent information about the respective composition component 210B, 212B, 254B. The metadata 220B, 222B, 294 may represent the results of the respective composition component 210B, 212B, 254B. Alternatively and additionally, the metadata 220B, 222B, 294 may represent data about the results of that composition component 210B, 212B, 254B, such as the number of lines or columns in the results of the composition component 210B, 212B, 254B. Alternatively, the metadata 220B, 222B, 294 may represent data about the composition component 210B, 212B, 254B, such as the time taken to compute results or suggestions for improvement of the component 210B, 212B, 254B.

In SQL commands that are made up of more than one composition component, the metadata associated with each component is a function of the query of the composition component and the metadata of the preceding component. Similarly to SQL statement 205 described above, metadata 222B is a function of both metadata 220B and composition component 212B. If metadata 220B were different, composition component 212B is acting upon different information and could lead metadata 222B to be different (e.g. a different shape or different resulting entries). Similarly, if composition component 212B was different, the instruction provided by the component 212B could lead to different results or otherwise different metadata 222B. Similarly, if metadata 222B or composition component 254B were different, metadata 294 could also be different.

As with metadata 220A, 220B, 224, the metadata 220B, 222B, 294 associated with the composition components 210B, 212B, 254B may be stored in a cache memory storage device 230. As discussed above, the cache memory storage device 230 refers to a volatile or non-volatile memory device, such as RAM, or any other device capable of caching data.

In an example, SQL statement 290 "SELECT*FROM Customers ORDER BY CustomerName Limit 25;" is made up of composition components 210B, 212B, 254B. In this example, if metadata 220B, 222B has already been computed for composition components 210B, 212B and that metadata 220B, 222B has been saved to the cache memory storage device 230, the metadata 220B, 222B may be retrieved from the cache memory 230 as opposed to being re-computed. Further, the debugging method 200C may compute metadata 254B for the modified component 254B using metadata 222B that was retrieved from cache memory 230.

In another example, the metadata 220B, 222B, 294 associated with the composition component 210B, 212B, 254B may be retrieved from a cache memory storage device 230. For example, where metadata 220B for a composition component 210B was already computed (e.g. metadata 220A) and the previously computed metadata has been stored on a cache memory 230, the present disclosure may retrieve the previously computed metadata 220A from the cache memory 230 as opposed to re-computing the metadata 220B. For example, where a first SQL command 205 begins with a composition component 210A which includes the statement "SELECT*FROM Customers" and metadata 220A has been computed for that component 210A, when that same component statement 210B is used in a second SQL command 280, the computation of SQL command 280 may retrieve the metadata of the composition component 210B from the metadata stored for the same composition component 210A stored in cache memory 230 as opposed to re-computing metadata 220B for that component.

Figure 3A:
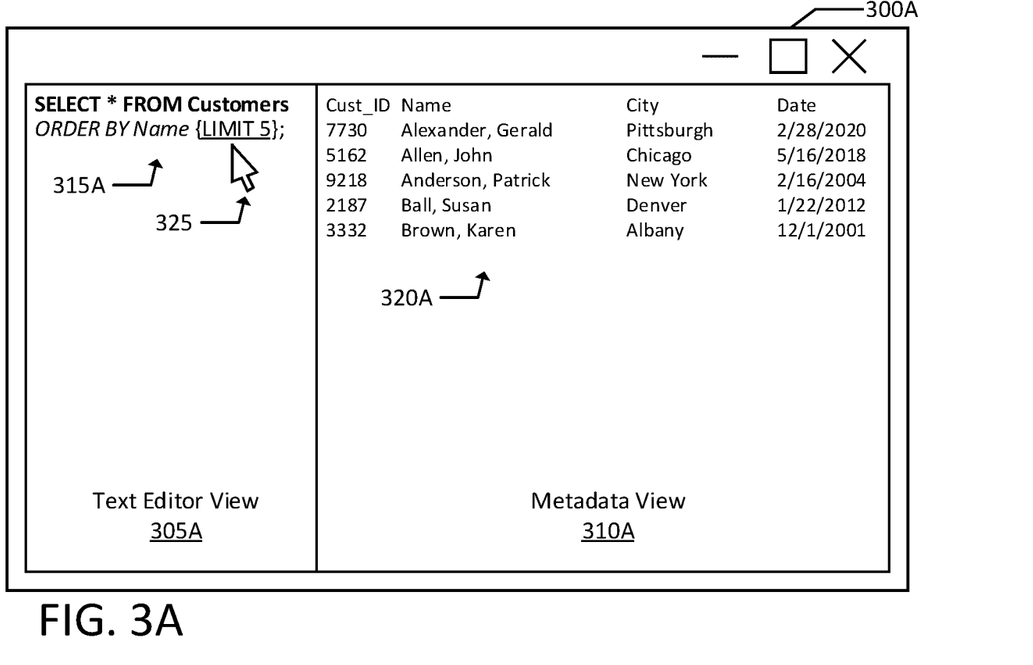
FIGS. 3A, 3B and 3C illustrate an example GUI for debugging an SQL statement according to an example embodiment of the present disclosure.
Figure 3B:
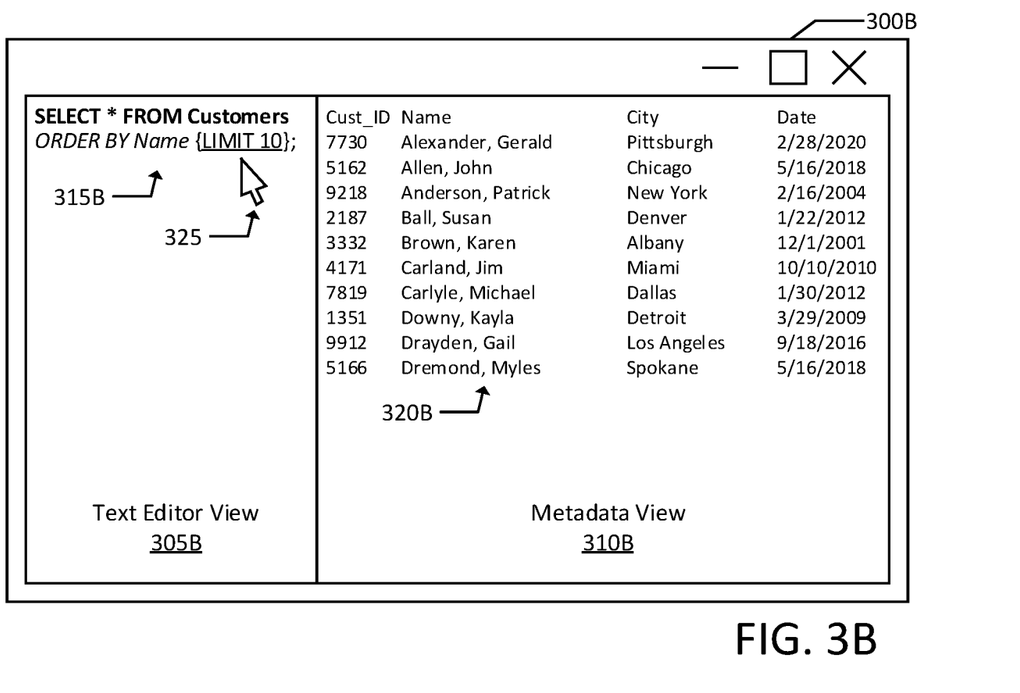
Figure 3C:
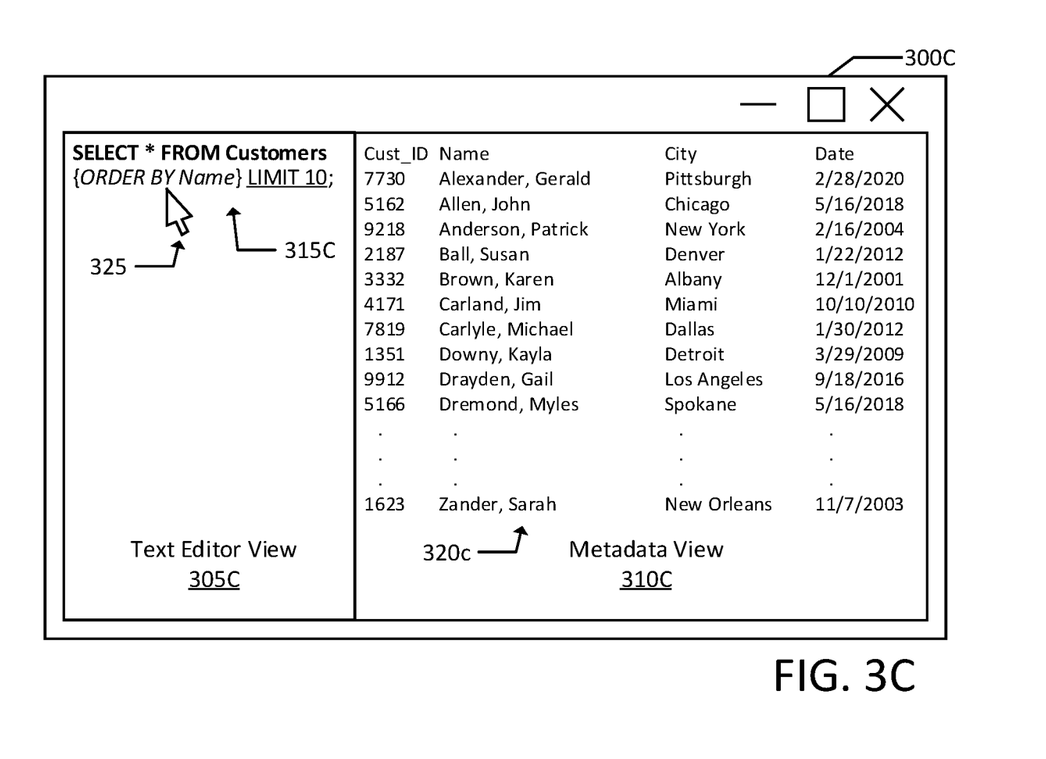

FIGS. 3A-C depict an example GUI 300A, 300B, 300C of a program for debugging an SQL command 315A-C. The GUI 300A, 300B, 300C may contain a text editor view 305A, 305B, 305C and may contain a metadata view 310A, 310B, 310C.

FIG. 3A depicts an example GUI 300A of a program for debugging an SQL statement 315A. In the illustrated example, an SQL command 315A is provided in a text editor view 305A. The example SQL statement 315A reads: "SELECT*FROM Customers ORDER BY Name LIMIT 5;". In the text editor view 305A, the composition components of the SQL statement 315A may appear in different fonts, colors, backgrounds, text size, indentation, or by any other distinguishing characteristic. In this way, users will be aware of the components of the SQL command and can then debug each individually.

The GUI 300A may also display metadata 320A in a metadata view 310A. As described above, the metadata 320A may include many things, including but not limited to the results of the component, details about the results such as the number of lines or columns, details about the component such as computation time, or any other information about the composition component. The metadata may also depict whether the composition component has previously been run or whether metadata for a component is stored in a cache memory.

The GUI 300A may also display metadata 320A in response to some user interaction, such as hovering over or double clicking a component of the SQL command 315A with a cursor 325. Other possible interactions include, but are not limited to, placing the insertion point between letters in the component or highlighting the text of the component in the text editor view 305A. The GUI 300A may also indicate whether a component has been interacted with according to the present disclosure by highlighting the component, or placing brackets around the component, or otherwise signaling to the user which component has been interacted with. For example, in the illustrated example, if a user hovers the cursor 325 over the component "LIMIT 5," in an SQL command 315A "SELECT*FROM Customers ORDER BY Name LIMIT 5;" the "LIMIT 5" component may be highlighted or bracketed and the metadata 320A shown in the results view may update to reflect the interacted with component—e.g. showing the first five results of the "Customer" table ordered by "Name."

Similarly, as depicted in the GUI 300B in the illustrated example in FIG. 3B, if the SQL command 315B is modified from the SQL command 315A to say "SELECT*FROM Customers ORDER BY Name LIMIT 10;" and the "LIMIT 10" component is interacted with by a user, such as with a cursor 325, the metadata view 310B may update to reflect the modified SQL command 315B. In an example, the metadata 320B shown in the metadata view 310B, may be the first ten results of the "Customer" table ordered by "Name." The metadata 320B shown in the metadata view 310B may also be any of the types of metadata previously described or any other information about the component that has been interacted with.

Similarly, as depicted in the GUI 300C in the illustrated example of FIG. 3C, if a different composition component of the SQL command 315C is interacted with by a user, such as with a cursor 325, the metadata view 310C may update to reflect the user's interaction with the SQL command 315C. In the illustrated example, if the component "ORDER BY Name," in an SQL command 315C "SELECT*FROM Customers ORDER BY Name LIMIT 10;" is interacted with, the metadata 320C shown in the metadata view 310C may be all results of the "Customer" table ordered by "Name" (i.e. the metadata before the results are further limited by the subsequent component, LIMIT 10). The metadata 320C shown in the metadata view 310C may also be any of the types of metadata previously described or any other information about the component that has been interacted with.

In another example, if the user has not selected any component, the metadata view 310C of the GUI 300C may show no information. Alternatively, the metadata view 310C may show information such as the metadata 320C of the last component in the SQL command 315C or whether metadata 320C is stored for any component portion of the SQL command 315C. Alternatively, the metadata view 310C may show a predicted computation time for the SQL command 315C in the text editor view 305C. Alternatively, the metadata view 310C may display any other information that may be useful to a user.

Figure 4:
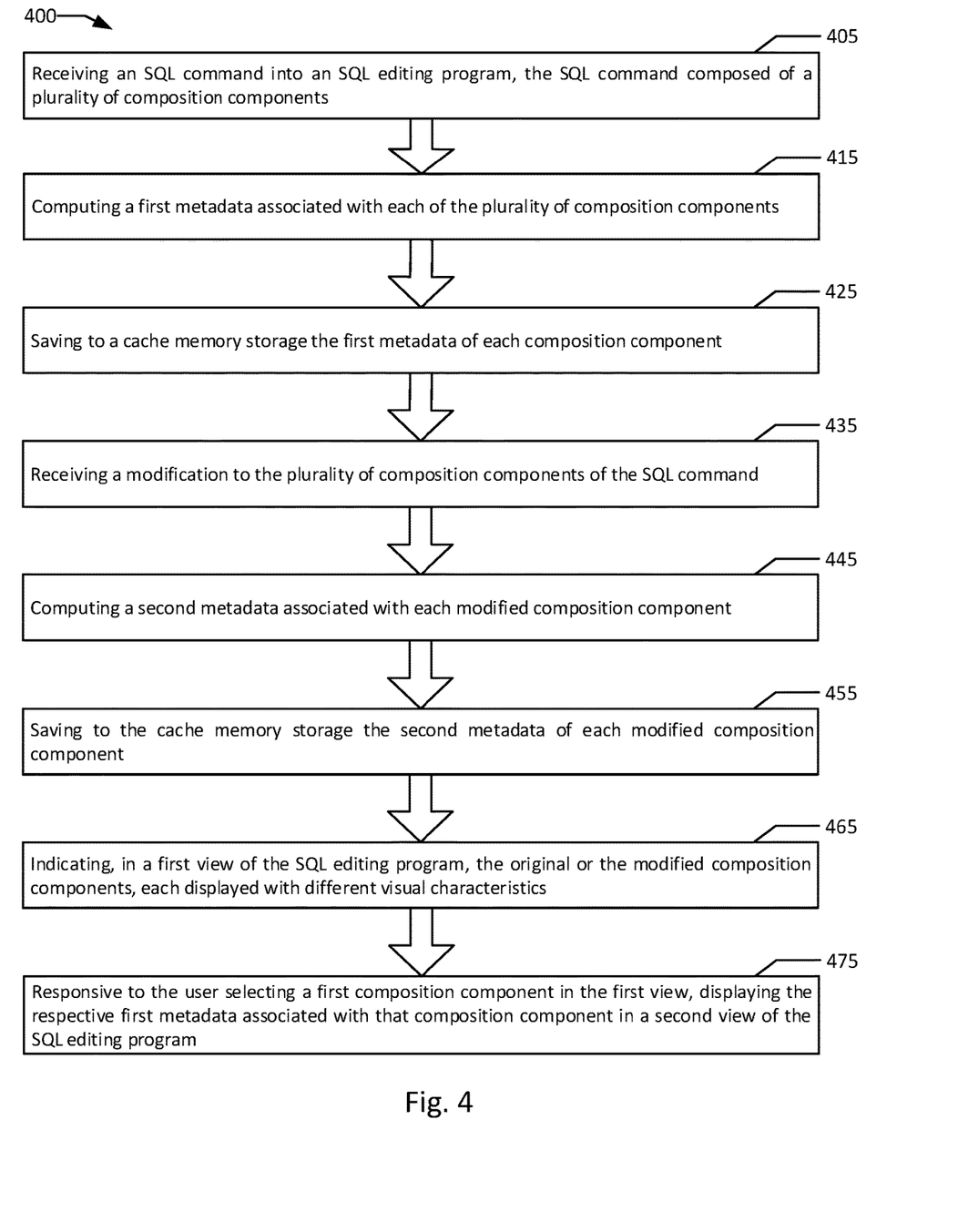
FIG. 4 illustrates a flowchart of an example method of debugging an SQL statement according to an example embodiment of the present disclosure.

FIG. 4 illustrates a flow diagram illustrating an example method 400 for debugging SQL commands. Although the example method 400 is described with reference to the flow diagram illustrated in FIG. 4, it will be appreciated that many other methods of performing the acts associated with the method may be used. For example, the order of some of the blocks may be changed, certain blocks may be combined with other blocks, blocks may be repeated, and some of the blocks described are optional. The method may be performed by processing logic that may comprise hardware (e.g., circuitry, dedicated logic, etc.), software, or a combination of both.

In the illustrated example, method 400 includes receiving an SQL command into an SQL editing program, the SQL command composed of a plurality of composition components (block 405). For example, an SQL command 205 composed of a plurality of composition components 210A, 212A, 214 may be received into a text editor view 305A of a GUI 300A of an SQL editing program. The method 400 also includes computing a first metadata associated with each of the plurality of composition components (block 415). For example, metadata associated with a composition component may include, but is not limited to, the results of the component, details about the results such as the number of lines or columns, details about the component such as computation time, whether the composition component has previously been run or whether metadata for a component is stored in a cache memory, or any other information about the composition component.

Method 400 also includes saving to a cache memory storage the first metadata of each composition component (block 425). For example, as shown in FIG. 2A, metadata 220A, 222A, 224 is stored on cache memory storage device 230. Method 400 further includes receiving a modification to the plurality of composition components of the SQL command (block 435). For example, method 400 may receive a modification to an SQL command 240 in the form of a plurality of modified composition components, such as 250, 252, 254A. Similarly, method 400 may receive a modification to an SQL command 280 in the form of a hybrid of original 210B, 212B and modified composition components 254B.

In the illustrated example, method 400 also includes computing a second metadata associated with each modified composition component (block 445). To continue the example above, if method 400 receives a modification to an SQL command 240 in the form of a plurality of modified composition components, such as 250, 252, 254A, method 400 may compute a second metadata 260, 262, 264 associated with those modified composition components. Similarly, if method 400 receives a modification to an SQL command 240 in the form of a hybrid of original 210B, 212B and modified composition components 254B, method 400 may compute a second metadata 294 associated with the modified composition components. Method 400 also includes saving to a cache memory storage the second metadata of each modified composition component (block 455). For example, as shown in FIG. 2B, metadata 260, 262, 264 is stored on cache memory storage device 230.

The method 400 may also include indicating, in a first view of the SQL editing program, the original or the modified composition components, each displayed with different visual characteristics (block 465). For example, in the example illustrated in FIG. 3A, SQL command 315A may be displayed with different fonts such as bold, italics, or underline. Alternatively or additionally, the composition components may be displayed with unique colors, backgrounds, indentations, or any other display method to distinguish components. In the illustrated example, method 400 also includes responsive to the user selecting a first composition component in the first view, displaying the respective first metadata associated with that composition component in a second view of the SQL editing program (block 475). A user may select a composition component by hovering over the component, clicking a component, or otherwise interacting with the component in the first view of the SQL editing program. For example, in the example illustrated in FIG. 3A, responsive to the user selecting a component of the SQL command 315A in the text editor view 305A, the results view 310A may show the metadata 320A associated with the component that has been interacted with.

Figure 5:
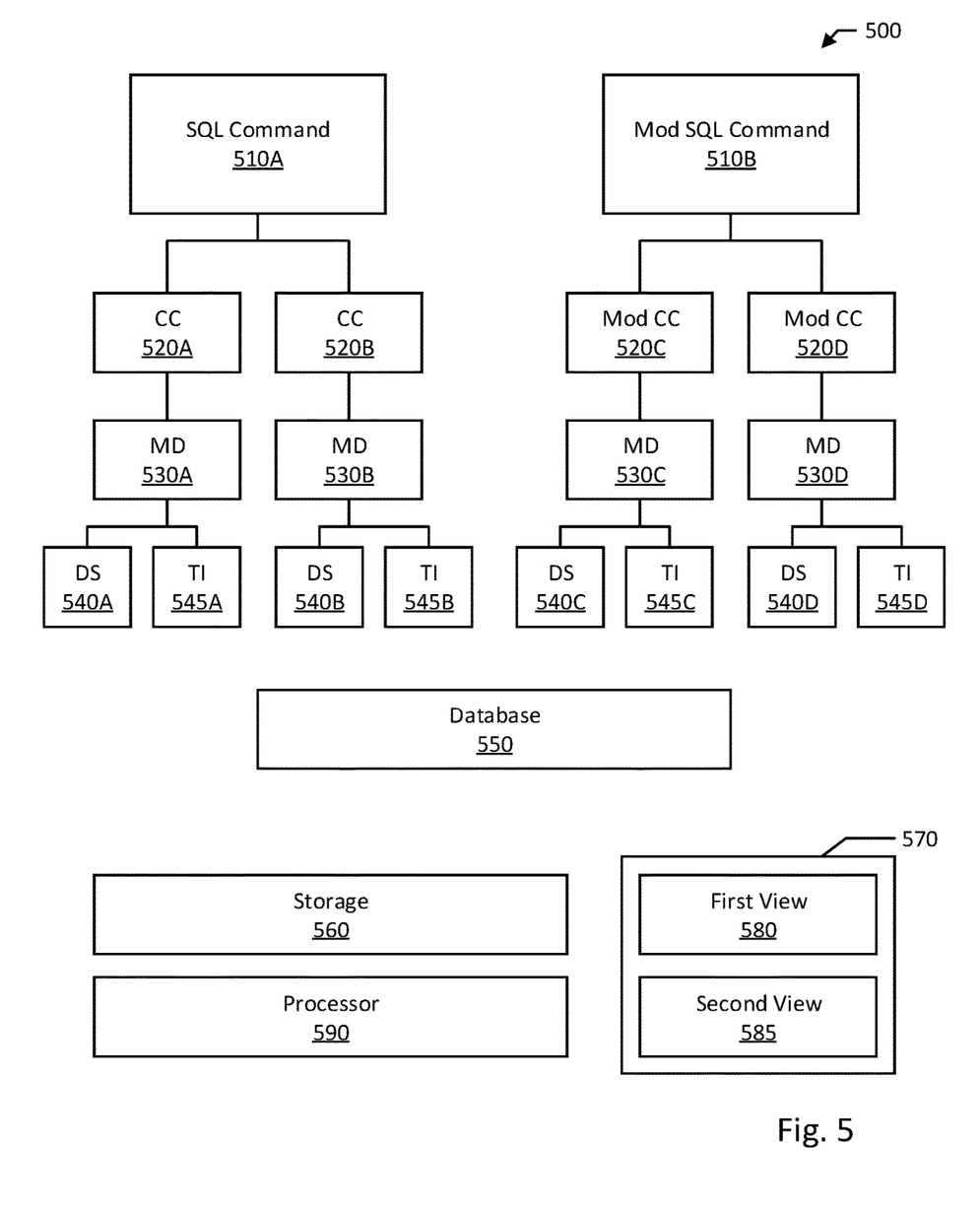
FIG. 5 illustrates a block diagram of an example system of debugging an SQL statement according to an example embodiment of the present disclosure.

FIG. 5 illustrates a system 500 for debugging SQL statements according to an example embodiment of the present disclosure. The system consists of a processor 590, computer readable storage medium 560, and a user interface ("UP") 570. The processor 590 is configured to receive an SQL command 510A, the SQL command 510A composed of a plurality of composition components 520A, 520B. The processor 590 is further configured to compute a first metadata 530A, 530B associated with each of the plurality of composition components 520A, 520B. The first metadata 530A, 530B computed for each composition component 520A, 520B may comprise at least a data structure 540A, 540B of a database 550 and a traversal instruction 545A, 545B for traversing the data structure 540A, 540B. The processor 590 is further configured to save the computed metadata 530A, 530B to the computer readable storage medium 560.

The processor 590 may also be configured to receive a modification to any of the plurality of composition components 520A, 520B of the SQL command 510A. The modified composition components 520C, 520D formulate a modified SQL command 510B. The processor 590 may also be configured to compute a second metadata 530C, 530D associated with each modified composition components 520C, 520D. Like the first metadata 530A, 530B, the second metadata 530C, 530D may comprise at least a data structure 540C, 540D of a database 550 and a traversal instruction 545C, 545D for traversing the data structure 540C, 540D. The processor 590 may be further configured to save to the computer readable storage medium 560 the second metadata 530C, 530D of each modified composition component 520C, 520D.

The processor may also be configured to indicate, in a first view 580 of the UI 570, the composition components 520A, 520B or the modified composition components 520C, 520D. The UI 570 may be configured to display each composition components 520A, 520B or modified composition components 520C, 520D with a different background, font, font color, indentation, or any other indicator that distinguishes the components in the view. The processor 590 may also be configured to, responsive to the user interacting with a first composition component 520A, 520B, 520C, 520D in the SQL command 510A, 510B on the first view 580 of the user interface 570, display the respective first metadata 530A, 530B, 530C, 530D associated with that composition component 520A, 520B, 520C, 520D in a second view 585 of user interface 570.

In another example, a non-transitory machine-readable medium stores code which, when executed by a computer system, causes the computer system to receive an SQL command composed of a plurality of composition components into an SQL editing program and compute a first metadata associated with each of the plurality of composition components. The metadata computed may be any metadata previously discussed in the present disclosure, or any other information related to the composition component or database queried by the component. The non-transitory machine-readable medium also causes the computer system to save to a cache memory storage the first metadata of each composition component.

Additionally, the non-transitory machine-readable medium may cause the computer to receive a modification to the plurality of composition components of the SQL command and compute a second metadata associated with each modified composition component. As with the first metadata, the non-transitory machine-readable medium may cause the computer system to save to the cache memory storage the second metadata of each modified composition component.

The non-transitory machine-readable medium may also store code that may cause the computer system to indicate, in a first view of the SQL editing program, the composition components or the modified composition components. In this first view, each composition component or modified composition component may be displayed with a different background, font, font color, or any other distinguishing characteristic. In addition, the non-transitory machine-readable medium may cause the computer system to display the first metadata associated with a composition component in a second view of the SQL editing program in response to the user hovering over, clicking, or otherwise interacting with the first composition component in the first view.

It will be appreciated that all of the disclosed methods and procedures described herein can be implemented using one or more computer programs or components. These components may be provided as a series of computer instructions on any conventional computer readable medium or machine readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A method comprising:
receiving an SQL command into an SQL editing program, the SQL command composed of a plurality of composition components, wherein each composition component defines an interaction with a database queried by the SQL command;
computing a first set of metadata, the first set of metadata comprising a first metadata associated with a first composition component and a second metadata associated with a second composition component;
saving to a cache memory storage the first set of metadata;
receiving a modification to the plurality of composition components of the SQL command;
computing a second set of metadata, the second set of metadata comprising at least a third metadata associated with a first modified composition component;
saving to the cache memory storage the second set of metadata;
indicating, in a first view of the SQL editing program, the composition components or the modified composition components, wherein each composition component or modified composition component is displayed with different visual characteristics; and
responsive to a user selecting a composition component in the first view, retrieving the metadata associated with that composition component from the cache memory storage and displaying that metadata in a second view of the SQL editing program.

2. The method of claim 1, wherein the first set of metadata comprises a data structure of a database and an instruction for traversing the data structure.

3. The method of claim 2, wherein the first set of metadata comprises an instruction for filtering the data structure.

4. The method of claim 1, wherein the first set of metadata comprises a result of the SQL command.

5. The method of claim 1, wherein responsive to the user selecting the first modified composition component in a modified command, displaying the associated third metadata in the second view of the SQL editing program.

6. The method of claim 1, wherein the second set of metadata comprises only the metadata of the composition components that received a modification.

7. The method of claim 6, wherein computing the second set of metadata begins with a portion of the first set of metadata associated with the one or more composition components that did not receive the modification and that is saved in the cache memory storage.

8. The method of claim 1, wherein the SQL command is made of at least two composition components, wherein the first composition component is a tree in a database, and remaining composition components are keys for interpreting the tree of the first composition component.

9. A system comprising:
a computer readable storage medium;
a user interface; and
a processor, the processor configured to:
receive an SQL command, the SQL command composed of a plurality of composition components, wherein each composition component defines an interaction with a database queried by the SQL command;
compute a first set of metadata, the first set of metadata comprising a first metadata associated with a first composition component and a second metadata associated with a second composition component;
save to the computer readable storage medium the first set of metadata;
receive a modification to at least one of the plurality of composition components of the SQL command;
compute a second set of metadata, the second set of metadata comprising at least a third metadata associated with a first modified composition component;
save to the computer readable storage medium the second set of metadata of each modified composition component;
indicate, in a first view of the user interface, the composition components or the modified composition components wherein the user interface is configured to display each composition component or modified composition component with different visual characteristics; and
responsive to a user selecting a composition component in the command on the first view of the user interface, retrieve the metadata associated with that composition component from a cache memory storage and display that metadata in a second view of the user interface.

10. The system of claim 9, wherein the first set of metadata comprises a data structure of a database and an instruction for traversing the data structure.

11. The system of claim 10, wherein the first set of metadata comprises an instruction for filtering the data structure.

12. The system of claim 9, wherein the first set of metadata comprises a result of the SQL command.

13. The system of claim 9, wherein responsive to the user selecting the first modified composition component in a modified command in the first view, the user interface is configured to display the associated third metadata in the second view.

14. The system of claim 9, wherein the second set of metadata comprises only the metadata of the composition components that received a modification.

15. The system of claim 14, wherein the processor is configured to compute the second set of metadata beginning with a portion of the first metadata associated with the one or more composition components that did not receive the modification and that is saved in the cache memory storage.

16. The system of claim 9, wherein the SQL command is made of at least two composition components, wherein the first composition component is a tree in a database, and remaining composition components are keys for interpreting the tree of the first composition component.

17. A non-transitory, machine-readable medium storing code which, when executed by a computer system, cause the computer system to:
receive an SQL command into an SQL editing program, the SQL command composed of a plurality of composition components, wherein each composition component defines an interaction with a database queried by the SQL command;
compute a first set of metadata, the first set of metadata comprising a first metadata associated with a first composition component and a second metadata associated with a second composition component;
save to a cache memory storage the first set of metadata;
receive a modification to the plurality of composition components of the SQL command;
compute a second set of metadata, the second set of metadata comprising at least a third metadata associated with a first modified composition component;
save to the cache memory storage the second set of metadata of each modified composition component;
indicate, in a first view of the SQL editing program, the composition components or the modified composition components, wherein each composition component or modified composition component is displayed with different visual characteristics; and
responsive to a user selecting a composition component in the first view, retrieve the metadata associated with that composition component from the cache memory storage and display that metadata in a second view of the SQL editing program.

18. The machine-readable medium of claim 17, wherein responsive to the user selecting the first modified composition component in a modified command, displaying the associated third metadata in the second view of the SQL editing program.

19. The machine-readable medium of claim 17, wherein the second set of metadata comprises only the metadata of the composition components that received a modification.

20. The machine-readable medium of claim 19, wherein computing the second set of metadata begins with a portion of the first metadata associated with the one or more composition components that did not receive the modification and that is saved in the cache memory storage.

* * * * *